United States Patent Office 3,532,870
Patented Oct. 6, 1970

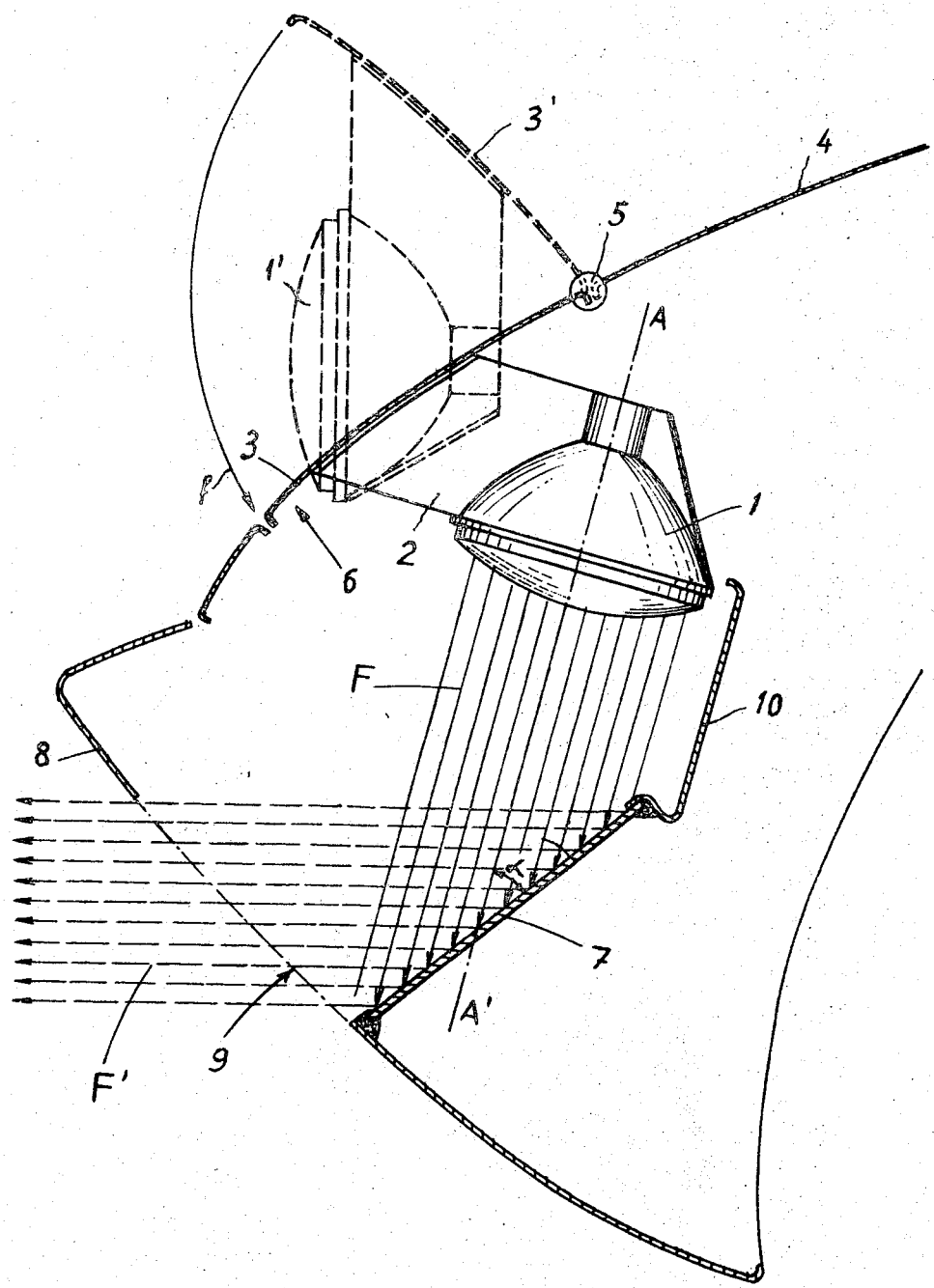

3,532,870
RETRACTABLE HEADLAMPS WITH MIRROR
Antoine Brueder, Paris, France, assignor to Societe
Anonyme Andre Citroen, Paris, France
Filed Mar. 11, 1968, Ser. No. 712,049
Claims priority, application France, Apr. 25, 1967,
104,111
Int. Cl. B60q 1/06
U.S. Cl. 240—7.1   3 Claims

ABSTRACT OF THE DISCLOSURE

Retractable headlamp device for a vehicle body wherein a pivotally mounted shutter on the body is normally streamlined with the body and is movable to a position projecting from the body. A headlamp is mounted on the shutter and is located within the body when the shutter is in streamlined position and when the shutter is in projecting position throws its beam outside the body. A fixed mirror is mounted within the vehicle body and is spaced below the headlamp. A deflector is mounted upon the body between the mirror and the position of the headlamp when within the body. The vehicle body has an aperture adjacent the mirror with a water-tight transparent screen covering the aperture. The headlamp when inside the vehicle body throws its beam upon the mirror so that such light beam is prevented from dispersion by the deflector and is reflected by the mirror through the transparent screen to serve as an auxiliary lamp.

---

The present invention relates to a retractable headlamp for an automotive vehicle.

The present trend towards increasingly streamlined automotive bodies leads manufacturers to use headlamps adapted to be retracted within the body during driving periods not requiring the road illumination by the vehicle.

Hitherto known devices designed for headlamps of this type are objectionable in that the light beams emitted from the lamps cannot be used when the projectors are in their retracted position.

It is the essential object of this invention to provide a retractable headlamp assembly which avoids the inconveniences of known devices of this character when in their collapsed position, without affecting the aerodynamic properties of the vehicle body.

This device is essentially characterised in that the light beam emitted from a pivotally mounted headlamp is directed in the collapsed position of the lamp, against at least one fixed mirror and reflected thereby through at least one aperture provided in the lower portion of the vehicle body.

The advantages and other features of this device will appear more clearly as the following description proceeds with reference to the single figure accompanying drawing illustrating diagrammatically by way of example a typical form of embodiment of a retractable headlamp and mirror combination.

In the drawing the open-road headlamp 1 is secured by adequate means 2 to a shutter 3 pivotally mounted on the front portion 4 of the vehicle body. This shutter 3 is pivoted at its rear end on a pin 5 so that it can be dipped by means of a known mechanism such as shown in Pat. No. 3,266,336 granted Aug. 16, 1966 to E. Henry-Biabaud, in the direction of the arrow f or in the opposite direction, i.e. from a day-driving position 3 shown in full lines to a night-driving position 3' shown in dash lines, or vice-versa. An aperture 6 is formed to this end in the front portion 4 of the vehicle body.

In the night-driving position 3' of the shutter the lamp carried thereby is in its normal position for illuminating the road ahead of the vehicle. When the shutter is collapsed and kept in its day-driving position 3 in which it closes the aperture 6, it is merged into the general contour of the vehicle body and the lamp 1 is housed within the vehicle body. Thus, the lamp 1 is efficiently protected by the body during about 90% of the driving time of the vehicle, i.e. the periods during which the headlamps are not used.

A mirror 7 mounted within the vehicle body beneath the lamp in position 1 is secured to the lower portion 8 of the front of the vehicle body, so as to form a predetermined angle therewith. An aperture 9 is formed in this lower front portion 8 of the vehicle body, in the vicinity of the mirror 7. The angle of inclination of the reflecting face of the mirror 7, in relation to the optical axis A–A' of the lamp, is such that the light beam F emitted from the lamp 1 and reflected by the mirror forms a secondary, substantially horizontal beam F' through the aperture 9.

This aperture 9 is provided with a water-tight transparent screen having contingently optical properties consistent with those of the transparent glass of headlamps. A deflector 10 disposed between the mirror 7 and the headlamp 1 prevents the dispersion of light flux emitted from this lamp.

Moreover, various mirror and aperture combinations may be contemplated, and used separately or in combination, with a view to obtain for example the following effects:

(a) Reflecting the light beam to the front of the vehicle;
(b) Reflecting the light beam in a lateral direction of the vehicle;
(c) Reflecting the light beam both forward and laterally by using at least two sets of mirrors and apertures having adequate characteristics or properties.

The low position of the secondary light beam F', which is definitely lower than the position of the beam issuing from the lamp 1' in its normal or night-driving position, attenuates the dazzling effect of the beam and permits, by using a suitably treated glass at 9, of utilizing these lamps as fog-lamps.

This secondary beam F' may also be used instantaneously and repeatedly as conventional open-road lamps whenever the operation of the headlamp mechanism is not required or when this operation would require a too long lapse of time. Thus, this beam F' may be used in the flash fashion for warning the traffic ahead of the vehicle in case of overtaking, etc., or for momentary driving through a dark zone.

The possibility of lateral illumination permits of using the secondary beam F' as a comlementary light source when the fog lamps are turned on.

Although the above described arrangement constitutes a preferred form of embodiment of the invention, it would not constitute a departure from the basic principle thereof to bring various modifications and variations thereto, as anybody conversant with the art will readily understand. Such modifications and variations, however, remain within the scope of the invention as set forth in the appended claims.

I claim:
1. Retractable headlamp device for a vehicle body comprising a pivotally mounted shutter on said body normally streamlined with said body and movable to a position projecting from said body, a headlamp mounted on said shutter located within said body when said shutter is in streamlined position and when said shutter is in projecting position throwing its beam outside said body, a fixed mirror mounted within said vehicle body spaced below said headlamp, a deflector mounted upon said body between said mirror and the position of said headlamp within said body, said vehicle body having an aperture adjacent said mirror, a water-tight transparent screen covering said aperture, said headlamp when inside said vehicle body having its optical axis forming an angle with said mirror so that a light beam emitted from said headlamp is prevented from dispersion by said deflector and is reflected by said mirror through said transparent screen whereby said headlamp serves as an auxiliary lamp.

2. Retractable headlamp device according to claim 1, wherein said aperture is formed at the front of the lower portion of said body.

3. Retractable headlamp device according to claim 1, wherein said headlamp beam is directed to the front of the vehicle.

References Cited

UNITED STATES PATENTS 3,266,336  8/1966  Henry-Biabaud ---- 240—7.1 XR

FOREIGN PATENTS 256,981  1/1928  Italy.

NORTON ANSHER, Primary Examiner

K. C. HUTCHISON, Assistant Examiner

U.S. Cl. X.R.

240—8.1, 61.8